Sept. 6, 1932.   H. SIDGREAVES   1,876,352
COMPENSATING MECHANISM FOR MACHINE TOOLS
Filed April 29, 1930   2 Sheets-Sheet 2
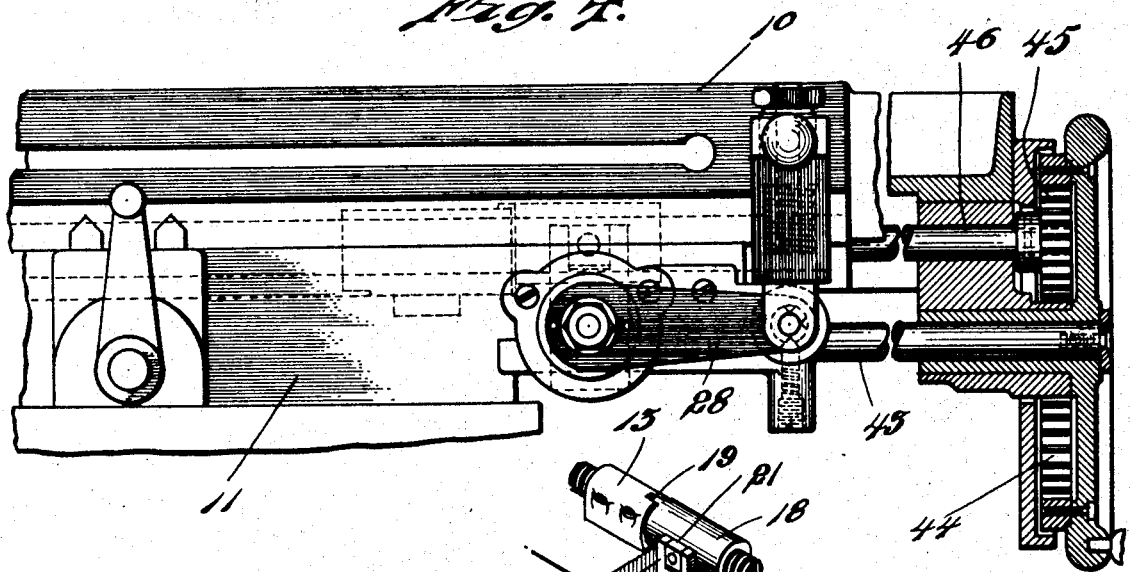
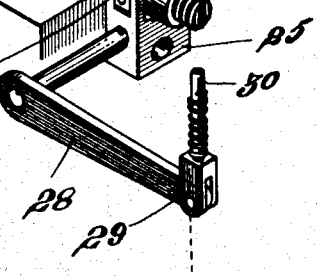
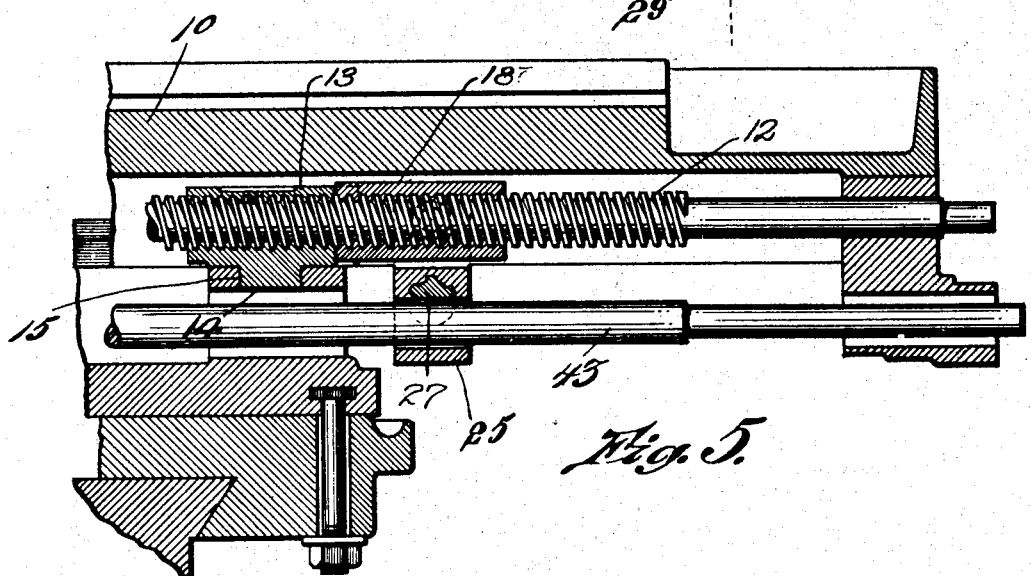
INVENTOR.
Henry Sidgreaves
BY Barlow + Barlow
ATTORNEYS.

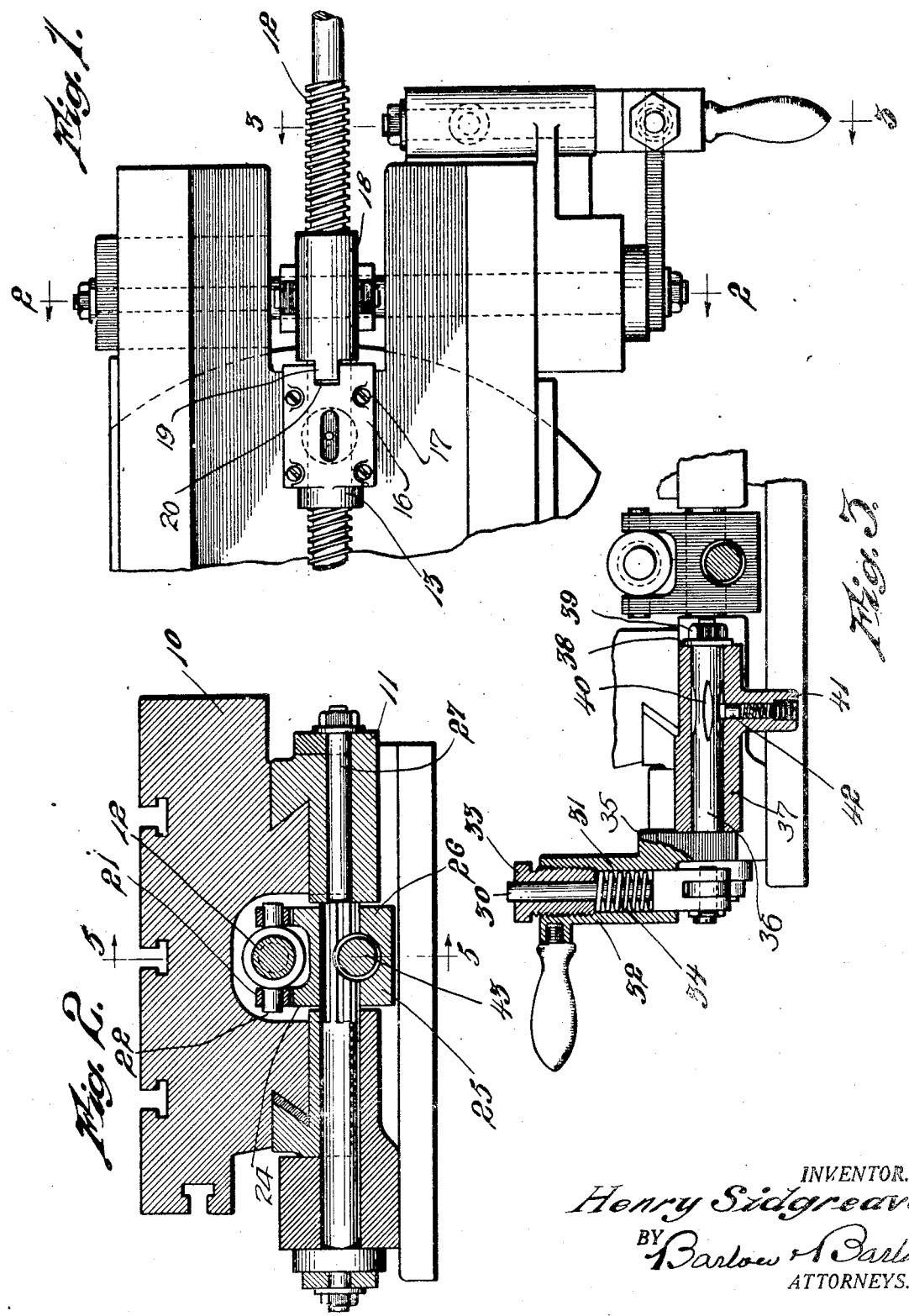

Patented Sept. 6, 1932

1,876,352

UNITED STATES PATENT OFFICE

HENRY SIDGREAVES, OF PAWTUCKET, RHODE ISLAND, ASSIGNOR TO BROWN & SHARPE MANUFACTURING COMPANY, OF PROVIDENCE, RHODE ISLAND, A CORPORATION OF RHODE ISLAND

COMPENSATING MECHANISM FOR MACHINE TOOLS

Application filed April 29, 1930. Serial No. 448,247.

My present invention relates to drive mechanism for machine tool supports, and particularly pertains to improvements in the mechanism for moving the tables or work suports in such machines.

The tables or work supports are ordinarily moved by screw and nut mechanism which is difficult to machine and to fit closely, and which wears during the life of the machine, so that there is a small amount of endwise axial play of the screw with respect to the nut. This play or looseness lowers the accuracy of the work settings, and the resulting back lash permits chattering or vibration to take place, the latter feature being particularly objectionable in milling machines. Moreover, when the tool is cutting in the same direction that the work is fed, the looseness or play permits an objectionable forward movement of the work due to the bite of the tool. The principal object of my invention is to provide compensating mechanism which will automatically and continuously prevent this relative play of the screw with respect to the nut.

Since the normal operation of a metal working machine utilizes a portion only of the available stroke and the operating stresses are not uniform, the wear of the screw is not uniform throughout its length. Another object of the invention is to construct the compensating mechanism to automatically compensate for relative wear of the nut and the screw and the uneven wear of the screw.

More specifically, the present invention relates to improvements in constructions similar to that described and claimed in applicant's co-pending application Serial No. 448,248 filed April 29, 1930, and has particular reference to a simplified construction and arrangement for the compensating mechanism.

With these and other objects and advantageous features in view, the invention consists in a novel arrangement of parts more fully disclosed in the detailed description following, in conjunction with the illustrative drawings, and more particularly pointed ut in the appended claims.

In the drawings:

Fig. 1 is a fragmentary plan view of a milling machine showing the novel compensating mechanism;

Fig. 2 is a section on the line 2—2 of Figure 1;

Fig. 3 is a section on the line 3—3 of Figure 1;

Fig. 4 is a front elevation, partly in section, showing the power gearing for the operating screw;

Fig. 5 is a section similar to Figure 4, taken on the line 5—5 of Figure 2; and

Fig. 6 is a perspective view illustrating the control mechanism for the compensating nut.

It has been found desirable to eliminate back lash and play in the screw and nut mechanism utilized for reciprocating the tables or work supports of milling machines or the like. I have devised a simple construction which includes a shiftable compensating nut for holding the operating screw in continuous contact with the threads of the operating nut, thus taking up all lost motion, and a spring pressed leverage construction for yieldingly shifting the compensating nut in an axial direction one way or the other with respect to the operating screw; and the following is a detailed description of a specific construction which embodies the principles of my invention.

Referring to the drawings, the table 10 is slidingly mounted in the saddle 11 which may be designated as a machine base, in the usual manner, and is reciprocated by the operating screw 12 rotatably mounted therein; the operating screw is threadedly engaged with the stationary nut 13, which has a depending lock portion 14 received in a corresponding aperture 15 provided in the saddle 11. The stationary nut is provided with an integral cap portion 16 secured to the saddle by screws 17 or the like, the cap portion having the usual oil well and communicating oil port for supplying lubricating oil to the operating nut and screw.

A movable compensating nut 18 is positioned adjacent the stationary nut and threadedly engages the operating screw 12, and has a lateral key extension 19 which fits into a correspondingly machined slot or notch 20 in the cap portion 16, thus preventing rotation of the compensating nut while permitting a small amount of axial movement thereof.

Referring now to Figure 6, the compensating nut 18 is provided with two guide blocks 21, which are rotatably mounted on pins or trunnions 22 integral with or otherwise secured to the sides of the compensating nut; these blocks are slidingly received in corresponding vertical slots 23 in the yoke arms 24 of a shift block 25.

The shift block 25 has a transverse bore 26 splined to receive a correspondingly splined control shaft 27 which is rotatably mounted in the saddle 11. A control link 28 is keyed at one end to the forward end of the shaft 27, and is pivotally mounted at the other end between the bifurcated arms 29 of a control rod 30. As will be noted from Figure 4, the control rod 30 is slidingly mounted in the bore 31 of a manually operatable handle 32, an annular closure cap 33 screw-threadedly engaging the other end of the bore and functioning as a guide bearing for the upper end of the control rod.

The bifurcated arms 29 of the control rod are preferably of substantially the same width or diameter as the bore 31 to be guided therein, and a strong spring 34 is positioned in the bore between the arms 29 and the closure cap 33 to constantly and yieldingly urge the control rod outwardly from the bore. The handle 32, as shown in Figure 3, has an offset portion 35 with a lateral lock shaft 36 extending therefrom and rotatably mounted in a bearing 37, the end of the shaft being reduced to receive a washer 38 and threaded to receive a lock nut 39, the washer 38 being thus secured between the lock nut and the end of the bearing to lock the handle against removal.

The shaft 36 has a number of spaced indentures 40 therein, and the bearing 37 has a depending portion 41 adjacent the indentures in which a spring pressed lock pin 42 is mounted, whereby the handle may be rotated and retained in position above the end of the link 28, vertically below, or in a horizontal, neutral position, thus changing the direction of pressure of the control rod on the control link.

Referring now to Figure 4, the preferred power gearing for the particular type of milling machine illustrated includes power shaft 43, which may pass, if space is limited, through a suitable clearance opening in the control shaft 27. The power shaft rotates an annular gear 44 keyed thereto, which may form part of or be secured to the usual hand wheel, the gear 44 in turn rotating a spur gear 45 which is keyed to the stub shaft 46 forming the end of the operating screw 12.

The operation of the compensating mechanism may now be explained:

The parts being assembled as shown in Figures 4 and 5, the compensating nut cannot turn, but may be shifted axially to the right or left to contact with the operating screw and thus take up all lost motion and play and prevent back lash. This shifting is accomplished by turning the control handle so as to position the control rod above or below the contiguous end of the control link, the spring then forcing the control rod to turn the control link and rotate the control shaft. This movement of the control shaft tilts the shift block, and causes the yoke arms of the shift block to move the trunnions of the compensating nut, and therefore the nut itself, to the right or left, thus firmly pressing the threads of the compensating nut into engagement with the operating screw. The operating screw is therefore held in continuous contact with both the threads of the stationary nut and the compensating nut.

When the cutter is cutting in the direction opposite to the feeding of the work, the back lash is negligible, and the compensating nut may be left in neutral position. When the cutter is rotating in the direction that the work is fed, the compensating nut is shifted in the same direction and the yieldable engagement of its threads with the operating screw takes up all lost motion and play of the operating screw with respect to the stationary nut.

Since the pressure of the compensating nut against the operating screw is quite heavy, the operating handle is preferably placed in neutral position when moving the table or work support by hand, thus relieving the pressure on the nut and permitting easy manual rotation of the operating screw.

My improved compensating mechanism therefore utilizes a small number of parts, is easily constructed and easily mounted in a milling machine or the like, and automatically eliminates back lash and play by engaging a yieldable member with the operating screw axially in the direction of feed. The use of a yielding spring permits the necessary flexibility to compensate for uneven wear of the screw and for slight variations in the pitch or lead of the operating screw and nut threads.

While I have described certain construction forms which embody the principles of my invention, it is obvious that other desired changes in arrangement may be made within the spirit and the scope of the invention as defined in the appended claims.

I claim:

1. In a machine tool, a base, a movable support, a rotatably screw connected to said movable support for reciprocation thereof, a movable nut mounted on said base and threadedly engaging said screw, means for positively locking said movable nut against rotation, a rotatable shaft, means for axially moving said movable nut on rotation of said shaft, and yielding means tending to rotate said shaft.

2. In a machine tool, a base, a movable support, a rotatable screw connected to said movable support for reciprocation thereof, a movable nut mounted on said base and threadedly engaging said screw, means for positively locking said movable nut against rotation, a rotatable shaft, means yieldingly urging rotation of said shaft, means for axially moving said movable nut on rotation of said shaft, and to move the yielding means to urge rotation of said shaft in different directions.

3. In a machine tool, a base, a movable support, a rotatable screw connected to said movable support for reciprocation thereof, a stationary nut having a slot at one end thereof and mounted on said base and threadedly engaging said screw, a movable nut mounted on said base and threadedly engaging said screw, an extension on said movable nut engaging said slot, a rotatable shaft, and means for axially moving said movable nut on rotation of said shaft.

4. In a machine tool, a base, a movable support, a rotatable screw connected to said movable support for reciprocation thereof, a stationary nut having a slot at one end thereof and mounted on said base and threadedly engaging said screw, a movable nut mounted on said base and threadedly engaging said screw, an extension on said movable nut engaging said slot a rotatable shaft, means yieldingly urging rotation of said shaft, and means for axially moving said movable nut on rotation of said shaft.

5. In a machine tool, a base, a movable support, a rotatable screw connected to said movable support for reciprocation thereof, a movable nut mounted on said base and threadedly engaging said screw, trunnions on said movable nut a yoke engaging said trunnions for axial movement of said movable nut, and a rotatable shaft operatively connected to said yoke.

6. In a machine tool, a base, a movable support, a rotatable screw connected to said movable support for reciprocation thereof, a movable nut mounted on said base and threadedly engaging said screw, means for positively locking said movable nut against rotation, a block engaging said movable nut for axial movement thereof, and a rotatable shaft splined to said block for moving said block and nut.

7. In a machine tool, a base, a movable support, a rotatable screw connected to said movable support for reciprocation thereof, a stationary nut mounted on said base and threadedly engaging said screw, a movable nut mounted on said base and threadedly engaging said screw, trunnions on said movable nut a yoke engaging said trunnions for axial movement of said movable nut, and a rotatable shaft operatively connected to said yoke.

8. In a machine tool, a base, a movable support, a rotatable screw connected to said movable support for reciprocation thereof, a stationary nut mounted on said base and threadedly engaging said screw, a movable nut mounted on said base and threadedly engaging said screw, and in engagement with said stationary nut for locking said movable nut against rotation a block engaging said movable nut for axial movement thereof, and a rotatable shaft splined to said block for moving said block and nut.

9. In a machine tool, a base, a movable support, a rotatable screw connected to said movable support for reciprocation thereof, a movable nut mounted on said base, means for positively locking said movable nut against rotation a block operatively engaging said nut for axial movement thereof, a rotatable shaft splined to said block, and means selectively urging rotation of said shaft in either clockwise or counter-clockwise direction.

10. In a machine tool, a base, a movable support, a rotatable screw connected to said movable support for reciprocation thereof, a movable nut mounted on said base, trunnions on said movable nut a yoke block having yoke arms operatively engaging said trunnions for axial movement of said movable nut, a rotatable shaft splined to said yoke block, and yieldable means selectively urging rotation of said shaft in either clockwise or counterclockwise direction.

11. In a machine tool, a base, a movable support, a rotatable screw connected to said movable support for reciprocation thereof, a stationary nut having a slot at one end thereof and mounted on said base and threadedly engaging said screw, a movable nut mounted on said base, an extension on said movable nut engaging said slot for locking said movable nut against rotation, a block operatively engaging said nut for axial movement thereof, a rotatable shaft splined to said block, and means selectively urging rotation of said shaft in either clockwise or counter-clockwise direction.

12. In a machine tool, a base, a movable support, a rotatable screw connected to said movable support for reciprocation thereof, a stationary nut mounted on said base and threadedly engaging said screw, a movable nut mounted on said base, trunnions on said movable nut, a yoke block having yoke arms operatively engaging said trunnions for axial movement of said movable nut, a rotatable shaft splined to said yoke block, and yieldable means selectively urging rotation of said shaft in either clockwise or counter-clockwise direction.

13. In a machine tool, a base, a movable support, a rotatable screw connected to said movable support for reciprocation thereof, a movable nut mounted on said base, means for locking said movable nut against rotation, a block operatively engaging said nut for axial movement thereof, a rotatable shaft splined to said block a manually operable handle, means including said handle for selectively urging rotation of said shaft in either clockwise or counter-clockwise direction, or for neutralizing said rotation urging means.

14. In a machine tool, a base, a movable support, a rotatable screw connected to said movable support for reciprocation thereof, a stationary nut mounted on said base and threadedly engaging said screw, a movable nut mounted on said base, means for locking said movable nut against rotation, a block operatively engaging said nut for axial movement thereof, a rotatable shaft splined to said block a manually operable handle, means including said handle for selectively yieldingly urging rotation of said shaft in either clockwise or counter-clockwise direction.

15. In a machine tool, a base, a movable support, a rotatable screw connected to said movable support for reciprocation thereof, a movable nut mounted on said base, means for locking said movable nut against rotation, a block operatively engaging said nut for axial movement thereof, a rotatable shaft splined to said block, a link keyed at one end to said shaft, and a spring pressed device operatively engaging the other end of said link and exerting pressure thereon, and means for moving said device to apply pressure on said link to move the same selectively in opposite directions about the shaft.

16. In a machine tool, a base, a movable support, a rotatable screw connected to said movable support for reciprocation thereof, a movable nut mounted on said base, trunnions on said movable nut, a yoke block operatively engaging said trunnions for axial movement of said movable nut, a rotatable shaft splined to said yoke block, a link keyed at one end to said shaft, a spring pressed device operatively engaging the other end of said link and exerting pressure thereon, and means for changing the direction of pressure of said spring pressed device on said other link end.

17. In a machine tool, a base, a movable support, a rotatable screw connected to said movable support for reciprocation thereof, a stationary nut mounted on said base and threadedly engaging said screw, a movable nut mounted on said base, trunnions on said movable nut, a yoke block operatively engaging said trunnions for axial movement of said movable nut, a rotatable shaft splined to said yoke block, a link keyed at one end to said shaft, a spring pressed device operatively engaging the other end of said link and exerting pressure thereon, and means for selectively positioning said spring pressed device to urge rotation of said link in a clockwise direction, to hold said link neutral, and to urge rotation of said link in a counter-clockwise direction.

18. In a machine tool, a base, a movable support, a rotatable screw connected to said movable support for reciprocation thereof, a movable nut mounted on said base, means for locking said movable nut against rotation, a block operatively engaging said nut for axial movement thereof, a rotatable shaft splined to said block, a link keyed at one end to said shaft, a spring pressed device operatively engaging the other end of said link and exerting pressure thereon, and means for moving said device to apply pressure on said link to move the same selectively in opposite directions about the shaft or for applying the spring pressure longitudinally of said link towards the center of said shaft for a neutral position thus removing the pressure from said nut.

In testimony whereof I affix my signature.

HENRY SIDGREAVES.